United States Patent
Matter

[11] 3,869,316
[45] Mar. 4, 1975

[54] ALLOY FOR THROUGH-THE-PARTITION INTERCELL CONNECTORS FORMED BY AN EXTRUSION-FUSION TECHNIQUE

[75] Inventor: Robert C. Matter, Anderson, Ind.

[73] Assignee: General Motors Corporation, Detroit, Mich.

[22] Filed: Nov. 23, 1973

[21] Appl. No.: 418,462

[52] U.S. Cl. ............................ 136/134, 136/79
[51] Int. Cl. ................................ H01m 13/10
[58] Field of Search ......... 136/134, 79, 80, 81, 175, 136/176

[56] References Cited
UNITED STATES PATENTS
3,803,378   4/1974   Pearson et al. .............. 136/134 R Primary Examiner—John H. Mack
Assistant Examiner—C. F. Lefevour
Attorney, Agent, or Firm—Lawrence B. Plant

[57] ABSTRACT

Improved extrusion-fusion-type intercell connectors and process involving: casting the plate strap lugs to be welded from a lead-antimony alloy comprising between about 2 percent by weight to about 4.5 percent by weight antimony, at least 0.03 but less than about 0.3 percent by weight tin and less than 0.001 percent sulfur; initially extruding the lugs into contact through an aperture in a battery intercell partition, the contact area being between 15 and 75 percent of the area of the aperture; and gradually heating the lug extrusions through a softening stage, an antimony-rich-phase melting stage, and an antimony-lean-phase melting stage. Force applied by rapid-response, declining force welding electrodes causes (1) the softened extrusions to reshape somewhat prior to melting, and (2) the antimony-rich-phase of the alloy to exude out of the welding zone filling voids in the aperture before any substantial melting of the antimony-lean-phase occurs. The resulting weld is dense (void-free), has an antimony-rich ring adjacent the aperture wall, and after rupturing, displays an indicator core useful for evaluating the welds made and monitoring the stability of the manufacturing process/equipment for making them.

1 Claim, 12 Drawing Figures

ALLOY FOR THROUGH-THE-PARTITION INTERCELL CONNECTORS FORMED BY AN EXTRUSION-FUSION TECHNIQUE

BACKGROUND OF THE INVENTION

This invention relates to the electrical resistance welding of lead-acid storage battery intercell connectors by the Extrusion-Fusion process described in United States Patent application Ser. No. 418,590 filed Nov. 23, 1973 entitled "Process and Apparatus for Making Intercell Connectors by an Extrusion-Fusion technique" filed concurrently herewith in the names of R. Matter and L. Spangler and assigned to the assignee of the present invention. More specifically, this invention improves that process by the use of controlled amounts of tin and sulfur in the lead alloys to provide a reliable readily controllable manufacturing-scale process with the lower antimony content (2% – 4.5%) alloys, and strong, substantially void-free intercell connectors.

The basic Extrusion-Fusion process, described in United States Patent application Ser. No. 134,442 filed Apr. 15, 1971, makes liquid-tight, low resistance, electrical connections between adjacent cells of a multi-cell lead-acid storage battery by: clamping two thick plate strap lugs tightly against an intercell partition having an aperture in it; squeezing two welding electrodes together through holes in the clamp to extrude lug metal out of the thick lugs into the aperture until contact is made therein, and passing welding current through the extruded metal to melt it and, under the continuing force of the electrodes, cause it to flow into any voids in the aperture while, at the same time, extruding more metal out of the lugs into the aperture until the aperture is packed full of lug metal. With the clamping and electrode forces still applied, the weld nugget is allowed to cool and solidify.

Among the problems with production-scale implementations of the Extrusion-Fusion process is assuring consistency from one weld to the next over an extended production run and to provide simple quality control techniques for monitoring the welding conditions and the product produced. Conventional non-destructive tests (e.g., air leak and IR drop) have not demonstrated sufficient sensitivity to detect poor quality welds and alert the operator that welding conditions should be corrected. The expression "welding conditions" is intended to include principally clamping force, electrode force and response (i.e., follow-through), welding current and welding time. This invention relates to controlling the tin and sulfur content of 2 percent – 4.5 percent antimonial leads so that these leads may be used in conjunction with the quality control techniques for monitoring the "welding conditions" described in the aforesaid United States Patent application Ser. No. 418,590. In this regard, it has been observed that the core size indicator test described in that application tended to be unreliable when the Sb-content of the alloy was in the range of about 2 percent to 4.5 percent by weight antimony. The composition of the alloy was found to be an independent variable requiring careful control in order to extend the usefulness of that core test into this lower range of antimonial lead.

An object of this invention is to provide a low antimony content (i.e., 2% – 4.5% SB) lead alloy which produces a reliable, readily-observable indicator of the welding history of the connection made therefrom and hence a manifestation as to whether welding condition adjustments are needed. This and other objects and advantages of this invention will become more readily apparent from the detailed description thereof which follows in which:

The invention of Ser. No. 418,590 comprehends cold extrusion to produce contact areas between 15 and 75 percent of the area of the aperture and the use of rapid-response electrodes coupled with a particular welding schedule involving gradually increasing the welding current to effect three distinct physical changes in the lug extrusions, (1) softening and reshaping, (2) antimony-rich-phase melting and (3) antimony-lean-phase melting. The expression "rapid-response" electrodes relates to the ability of the electrodes to instantaneously and forcefully follow-up any yielding of the lugs as their physical properties change. A preferred embodiment of that invention provides the rapid-response with declining-force electrodes and increasing force clamping. The term "declining force" electrodes relates to gradually lessening the force applied by the electrodes as the lead alloy softens and melts. The term "increasing-force" clamping relates to the gradual increase of clamping force as the lead softens and melts.

At the welding station, the lugs are clamped tightly against the partition wall and a portion of them cold extruded to contact within the aperture in the partition (see FIG. 5) to produce an initial contact area between 15 and 75 percent of the area of the aperture. The size of the contact area affects the initial contact resistance which in turn affects the amount of heat energy initially dissipated in the weld. Following contact in the aperture, the welding current is turned on and gradually built up to its maximum level. This technique of gradually increasing welding current is known in the resistance welding art as "upsloping," and with this technique both the initial and final current levels can be varied to provide an almost infinite current rise pattern. Combinations of "upslope and hold" or "upslope and downslope" may also be used, but seem to offer no particular advantages over upslope alone yet require more controls. For constant upslope modes, a welding time of at least three cycles and no more than about 11 cycles is preferred. Below three cycles, the effects of upsloping are lost and above 11 cycles, heat distortion of the plastic partition is evident. Welding times of five to seven cycles are most preferred.

Figures 5, 7:
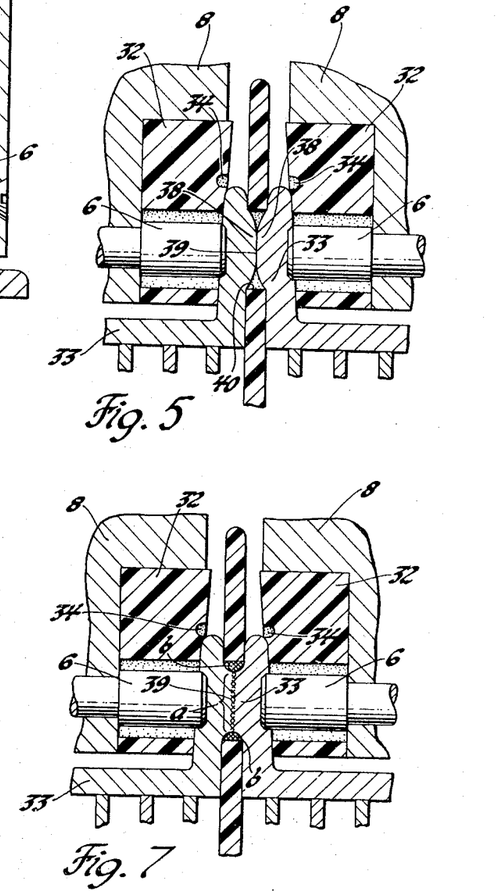
FIG. 5 is an enlarged sectional front elevational view of a portion of the tool of FIG. 2 and illustrates the condition of the parts after the initial cold extrusion step of the process.
FIG. 7 is an enlarged sectional front elevational view of a portion of the tool and illustrates the condition of the parts at the end of welding (i.e., current passage)
Figure 6:
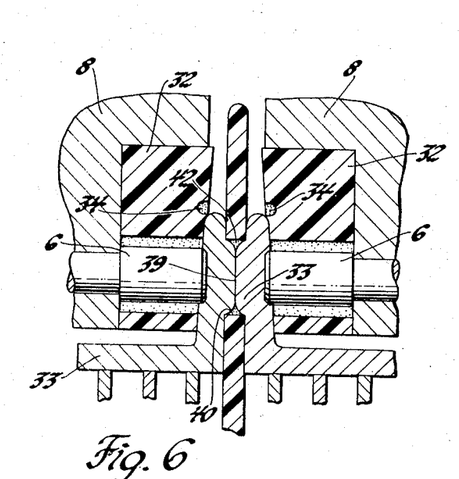
FIG. 6 is an enlarged, sectional front elevation view of a portion of the tool and illustrates the condition of the parts after the initial passing of current and extrusion, but before fusion commences.

As a result of the upsloping of the welding current, the lug extrusions slowly heat, soften and, under the applied electrode force extruding more lug into the aperture, enlarge somewhat to more completely fill the aperture just before melting commences (see FIG. 6). At the same time, the junction between the lug extrusions grows area-wise thereby reducing the contact resistance of the junction. Some void volume still remains in the aperture, principally in the form of a ring surrounding the junction and adjacent the aperture wall. The current continues to build putting more heat into the extrusions and the temperature at the junction continues to build until it eventually exceeds the melting point of the antimony-rich-phase of the alloy. The fine grains of the antimony-rich-phase quickly melt and under the unrelenting applied force of the rapid-response welding electrodes, the now liquid antimony-rich-phase exudes out of the weld zone into the remaining void space (see FIG. 7). The rapid-response electrodes insure filling of the void space with the lower melting phase before any substantial melting of the high melting antimony-lean-phase occurs. Finally, the temperature near the center of the weld zone eventually reaches the melting point of the antimony-lean-phase remaining thereat and it too begins to melt and complete the bonding of the lug extrusions. The composition of the lug alloy is important to the extent that it must be such as to provide a sufficient amount of the lower melting phase to fill the voids left in the aperture under the forces applied and before there is any substantial melting of the lead-rich phase. The alloyants required to effect this, however, must be such as to keep the hardness of the lead alloy in a range which permits the cold formation of the aforesaid contact areas. In alloys containing more than about 4.5 percent antimony, the antimony content alone seems adequate to provide the requisite hardness and amount of antimony-rich phase. But when the antimony content is in the range of about 2 percent to about 4.5 percent, the results are erratic and accordingly not useful in conjunction with the core (i.e., bond) size quality control test described hereinafter without the improvement of this invention. According to this invention, the plate strap lugs are cast (separately or directly onto the plates) from battery makers lead-antimony alloy having about 2 percent to about 4.5 percent Sb and controlled amounts of tin and sulfur. The tin content is kept within the range of 0.03 to less than about 0.3 percent (preferably about 0.2 percent) by weight. The sulfur content should be enough to effect grain refinement after casting but no more than 0.001 percent by weight. The remainder of the alloy is "principally lead" by which I mean to include not only pure lead but combinations thereof with other ingredients normally found in varying proportions in battery makers lead-antimony alloys. Typically this could include copper, iron, nickel, silver, bismuth, zinc and cadmium usually at levels less than about 0.1 percent by weight and arsenic up to about 0.3 percent.

As the lug casting cools, the alloy is segregated into a fine grained structure comprising a major portion of a high melting point antimony-lean-phase (i.e., alpha solid solution) and a minor portion of a lower melting point antimony-rich-phase (mixture of alpha and beta solid solutions in eutectic or near eutectic proportions) dispersed throughout the antimony-lean-phase. The fine grains of antimony-rich-phase harden the solid alloy sufficiently that the initial cold extrusion will not produce a contact area in excess of 75 percent of the area of the aperture, and melt quickly when their melting point is reached during welding. Welding preferably follows shortly after casting and before any significant age-hardening of the alloy occurs since age-harding introduces another variable into the system for which adjustments may be required.

The size of the bond formed between the high melting, antimony-lean-phase or center portion of the connection is used as an indication of the quality of the weld produced and the stability of the welding conditions. The size of this bond is observerable after twisting the connector to failure by first anchoring one of the lugs and then rotating the other lug in the plane of the partition until the intercell connector ruptures (see FIG. 8). Since the antimony-lean bond is weaker than the antimony-rich bond, rupture substantially invariably occurs through the weak bond thereby exposing it in the rupture plane. The exposed, ruptured, weak bond appears as a distinct island on the faces of the ruptured connector. These islands of ruptured weakly-bonded alloy or hereinafter designated as the "indicator cores." The number of inch-pounds required to twist the connector to failure indicates the strength of the weld. A cold weld (i.e., insufficient heat energy) yields a large indicator core. Such connections normally have strengths of less than 50 inch-pounds and cores greater than 0.3 inch in diameter, based on a 0.4 inch diameter aperture/connection. Welds having indicator cores less than 0.3 inch in diameter are acceptable. The absence of cores indicates that the welds are either too hot and are therefore on the threshold of splattering, or have inadequate electrode follow-through tending to produce porous welds. By porous welds is meant a weld which when subjected to vacuum impregnation (2 mm Hg for 3 min.) with a fluorescent oil (e.g., Zyglo ZL-15 waterwash penetrant sold by Magnaflux Corp.) and black light observation of the fractured sample will show no substantial penetration of the oil into the weld zone. Porous welds tend to create a joint which corrodes with time upon constant exposure to battery electrolyte. From a process control standpoint, a 0.1 inch diameter indicator core is selected as a reference point from which deviations can be made to determine process stability. In other words, the process is set to produce 0.1 inch cores and deviations therefrom are used to determine which direction the process is drifting during the course of a run and where corrections should be made. The 0.1 inch core welds have strengths of about 75 inch-pounds torque shortly after welding. This, of course, will vary depending on the precise composition of the alloy used to make the connection and the amount of age-hardening experienced by the alloy after welding. If the core size is outside the control range of 0.1 - 0.3 inch, one or more of the welding conditions must be adjusted to bring the process back into line. Obviously, one could get cores smaller than 0.1 inch and still have excellent welds, but it means that the process is either apprachjng a hot-welding condition or a slowing of electrode response time that should be corrected before a number of batteries are subsequently assembled with substandard quality. Since welding and clamping forces are for the most part built into the machine and cumbersome to adjust, the core sizes can be controlled by varying only the electrical current variables. For example, the cores can be significantly decreased in size (e.g., from 0.3 inch diameter) by merely increasing the maximum current or slightly decreased in size by increasing the initial current. Similarly, the core sizes can be significantly increased in size by decreasing the maximum current and slightly increased in size by decreasing the minimum current.

I have found that meaningful cores are produceable with most lead-antimony alloys having more than about 4.5 percent antimony, but that with antimony contents of between about 2 percent and 4.5 percent, meaningful indicator cores are produceable only when the tin and sulfur content is controlled in the ranges discussed heretofore. In this regard, I have observed that the cores produced in an Extrusion-Fusion type weld are not only affected by the welding conditions, but quite significantly by the composition of the alloy. I have observed, for example, that when the sulfur and tin content of a 2 percent – 4.5 percent Pb-Sb alloy is uncontrolled, the core size varies independently of the welding conditions, thereby rendering the core evaluation technique worthless as far as its being a meaningful welded condition indicator is concerned. I have found that by controlling the sulfur and tin content within the specified narrow ranges and welding the parts with the aforesaid "upsloping" current application and quick-response electrodes, indicator cores are produced which are dependent on the welding conditions and thus are a reliable yardstick for determining welding condition stability. In addition to fluidity advantages, the tin seems to provide just the right amount of hardness to repeatedly produce about the same size of weld extrusion and contact resistance between the extrusion wheeas the sulfur seems to contribute mostly to grain size refinement.

It is to be understood that both tin and sulfur are normally found in most battery makers lead-antimony alloys, but not at controlled levels such as discussed herein. In this regard, tin has been purposely added to grid casting alloys in quantities up to 1 percent for several reasons. To increase fluidity of the melt and help reduce casting pot drossing by oxidizing to a wet and thick tin-rich oxide which floats atop the melt and seals the pot against oxidation. Similarly, sulfur is often found in battery makers lead and is usually classified as an impurity causing brittleness. It is soluble in lead up to about 0.0001 percent beyond which it tends to form grain-forming sulfide nuclei. Sulfur, lilke tin, improves fluidity of the melt and forms an oxidation barrier in the casting pot.

The alloy of the present invention offers particular advantages in the cast-on-strap version of the casting operation (i.e., where the straps are cast directly onto the plate). In this regard, all cast-on-strap processes use either central holding pots and remote manifolds or open holding containers with metering valves or displacement bobs for directing a precise volume of lead into a strap casting mold. This preciseness insures good heat balance of the system to insure good fusion of the cast straps to grid lugs without melting of the plate lugs. A problem with such lead metering devices is that they suffer corrosive attack from molten lead and metal oxides tend to coat and build on the dispensing parts, orifices, and surfaces causing a dimensional change and rough surface that seriously interfere with an accurately dispensed volume. Tin and sulfur compounds contribute to this deterioration in dispensing accuracy. Tin and sulfur compounds produced from the tin and sulfur levels normally used in the battery industry form reactive surface drosses which, while convenient for sealing casting pots, aggravate the build-up problem on metering equipment. By limiting the sulfur content to a maximum of 0.001 percent (preferably 0.0003 - 0.0007 percent), the oxide build-up on the dispensing parts is minimized. Likewise, when the tin content is held to 0.3 percent maximum, the lead is not nearly so corrosive to valve materials and the sticky oxide of tin does not build up significantly on the metering apparatus to destroy its accurate operation.

The coupling of upslope welding with lead-antimony alloys containing at least about 2 percent Sb and rapid electrode response results in the production of welds which are substantially void-free and have high strengths (i.e., above about 50 inch-pounds). This apparently results from the redistribution of the antimony in the aperture that occurs during welding. As indicated, the lower-melting, antimony-rich lead migrates to the outside of the weld zone immediately on melting where it forms a ring of metal which is stronger than the antimony-lean center. Not only is this ring comprised of a stronger material but it occupies a substantial portion of the cross-sectional area of the weld and, more importantly, the portion which is subjected to the most stress is usage. Moreover, the antimony-lean center has a higher melting point than the antimony-rich outer ring thus resulting in a directional solidification from the center of the weld radially outward — the exact opposite of what occurs when there is no redistribution of antimony. This directional solidification contributes significantly to the void-free structure of the intercell connector produced by this process as no shrinkage cracks or voids are trapped in the center of the weld to weaken it or become a site for future failure due to corrosion. A still further advantage here is that only the lower melting antimony-rich metal contacts the aperture wall resulting in less heat distortion thereof during welding. This is a particular advantage in those situations where there is severe misalignment of the electrodes with the aperture as there is less tendency for the plastic to squirt into the aperture. Lastly, the lower melting antimony-rich ring has less tendency to dissolve metal from the lug at the edges of the aperture resulting in a much less tendency for lead splatter or expulsion to occur along the partition-lug interface.

The way in which the force is applied to the electrodes and hence the lugs is a significant variable in this process. In this regard, the force should be instantaneously and constantly applied to follow up the lead mobility as the lug advances through its several physical changes, i.e., softening, first stage melting and second stage melting. Without it the antimony-rich alloy is not quickly moved to the partition wall before the antimony-lean material fuses. This requisite instantaneous availability of force is not provided by a conventional pneumatic or hydraulic cylinder alone as there is a momentary lag between electrode movement in response to the yielding of the lug and the reestablishment of the pressure in the cylinder. In the few cycles (60 cycles/.sec.) when these physical changes are occurring, even momentary loss of significant electrode force results in poor quality welds. It has been found that incorporation of springs (e.g., Belleville springs, urethane pads, etc.) intermediate the hydraulic cylinder and the welding electrodes provide the requisite rapid-response electrode follow-through. These springs shall hereinafter be referred to as the force-follow-through springs. The use of Belleville springs is preferred since they have a flatter spring rate curve over the distances involved here. The precise amount of force required for each application will vary with the composition and age of the lead, the size of the aperture, the size of the extruding electrode, and the amount of current and upslope being used. In general, though, too little force can cause porosity or voids through which electrolyte can travel from one cell to the next and too much force can damage the parts and the tools. To make connectors using this sytem, the system is "locked-up" at the time the initial cold extrusion is made and all subsequent force applied to the clamps and electrodes comes from the force-follow-through springs which are compressed during the locking up. In the preferred embodiment shown in the drawings, the clamping members are urethane pads circumscribing the electrodes which compress during lock-up and subsequent follow-through of the electrodes and exert a counter force against the force-follow-through springs which increases as the force-follow-through springs expand. The net effect is that the clamping force increases and the electrode force decreases as the electrodes move together rapidly following the physical changes in the extrusions. This permits higher clamping force on the lugs and reduced hydraulic force on the molten metal which in turn reduces the likelihood of splatter or blow-out.

During welding, force on the parts comes from two sources, the force-follow-through springs and the force applied by the clamping means. In the preferred form of tooling for carrying out this invention, the clamping means are affixed to the electrode holders and are themselves spring-biased members circumscribing the welding electrode. In the most preferred form of tooling, the clamping means is a block or pad of compressible, high density polyurethane. The clamping forces need only be sufficient to prevent lead splattering or expulsion at a given current. In general the force required increases as the welding current increases. In the preferred system having force-follow-through springs and compressible clamping springs circumscribing the electrode, the strength of the force-follow-through springs must exceed that of the clamping springs sufficiently to overcome the counter force exerted by the clamping springs. In this regard, experience indicates that the force-follow-through springs should be capable of exerting at least about four times the force as the clamping springs and preferably at least about six times the force as measured with the welding gun in a closed or locked-up condition. It has been observed that high follow-through forces promote porosity (i.e., leakable voids) and require more electrical energy for comparable welds and that low follow-through forces require less clamping force and less energy for comparable welds.

In the most preferred system having a urethane pad as the clamping means, it has been observed that the relationship between the size of the electrode and the size of the aperture is important, primarily in terms of minimizing case warpage or distortion. This relationship also affects the quality of the weld. We have observed that when the ratio of the electrode diameter to the hole diameter is less than about 0.62 or more than 0.78, there is unacceptable partition distortion or poor welds.

Figures 1, 2, 3:
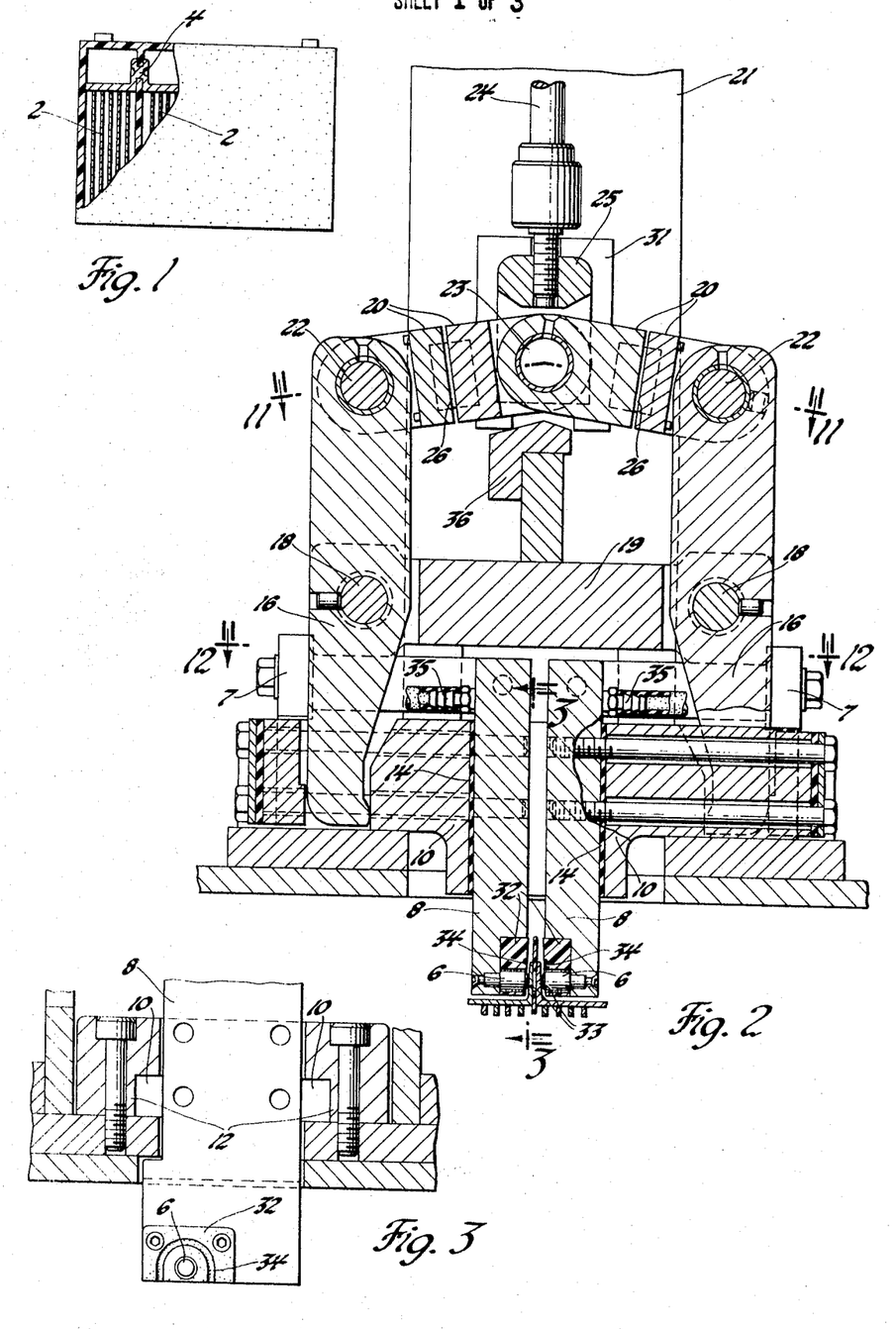
FIG. 1 is a partially sectioned front elevational view of a battery made in accordance with this invention.
FIG. 2 is a sectioned, front elevational view of a tool used in the process and the positioning of the parts at the initial stage of the process.
FIG. 3 is a partial sectioned view in the direction 3—3 of FIG. 2 showing a face of one electrode.

With respect to the drawings, the several Figures show the preferred tooling and illustrate the several stages involved in carrying out the process. FIG. 1 illustrates a battery having cell groups 2 in separate cells of the battery and a through-the-partition intercell connection 4 electrically joining the positive plates of one cell group to the negative plates of the next adjacent cell group. FIGS. 2, 3, 11 and 12 show the preferred tooling for carrying out the process, description of which assists in better understanding this invention. The tooling Figures show a toggle gun welder for making one intercell connection. In actual practice, however, additional tools would be so arranged as to simultaneously weld several or all (five in the case of a 12V battery) of the intercell connectors. As best shown in FIG. 2, opposing electrodes 6 are fixed to copper electrode holders 8 which in turn are affixed to slides 10 which slide horizontally in guides 12. Electrical energy is supplied to the electrodes 6 via connection 7 to an appropriate source, e.g., transformer (not shown). Electrical insulation 14 (e.g., cloth reinforced phenolic resin) is provided as required to insulate the holders 8 from the slides 10 and hence the remainder of the tooling. The electrode holders 8 are moved toward and away from each other as the slides 10 move in response to the action of lever arms 16 which pivot about pins 18 affixed to a portion 19 of the rame 21 of the apparatus and cam the slides 10 to-and-fro. The lever arms 16 are themselves driven by two-part actuator arms 20 joined thereto by pivot pins 22 and joined to each other in a toggle joint 23 at the output shaft 24 of a hydraulic cylinder (not shown). An inverted U-shaped coupling 25 connects the output shaft 24 to the toggle joint 23. The outboard ends 27 of the pin in the toggle joint 23 are carried in bronze bearings 29 which slide up and down in guides 31. Force-follow-through springs 26 (e.g., Bellevilles) are positioned between each of the two parts of the actuator arms 20, as shown. The Bellevilles 26 are centered by guide pins 28 and their compression adjusted by means of washer-like shims 30.

High density polyurethane pads 32 are provided around each of the electrodes 6 and serve to clamp the lugs 33 tightly against the walls of the intercell partition during the extrusion, fusion and cooling steps. The ends of the electrodes 6 protrude slightly (e.g., about 0.01 inch) out from the face of the pad so that piercing of the lugs 33 occurs slightly in advance of the clamping action of the pads 32. This reduces some of the force otherwise required to effect the additional amount of compression of harder pads 32 during welding. For softer pads 32, the electrode 6 may be flush with the face of the pads 32 or even depressed beneath the face depending on the overall force balance in the system.

A groove 34 is provided in the face of each of pads 32 and conforms, shapewise, substantially to the shape of the lugs 33 as best shown in FIG. 3. The width and depth of the groove 34 as well as its closeness to the periphery of the lug 33, permits adjustment of the compressibility of and hence force applied by the urethane pads 32. The groove also lessens localized stress buildup in the pad and greatly increases the life thereof. The clamping face of the urethane pads 32 may have the same angle as the draft angle of the lugs 33 so as to apply uniform clamping force, but in the preferred form, the angle on the clamping face exceeds the draft angle of the lugs by 2° to 6° (4° preferred) in order to apply more force to the top of the lug than at the base thereof.

Electrode coolant enters the electrodes 6 via fitting 35 and flows through appropriate channels (not shown) in the electrodes 6. A particular advantage of the use of urethane pads 32 lies in the ability to harden or soften the pads slightly without changing them by merely changing the temperature and/or flow rate of the electrode coolant thereby providing another means of "fine tuning" the force system apparatus, if necessary.

Figure 4:
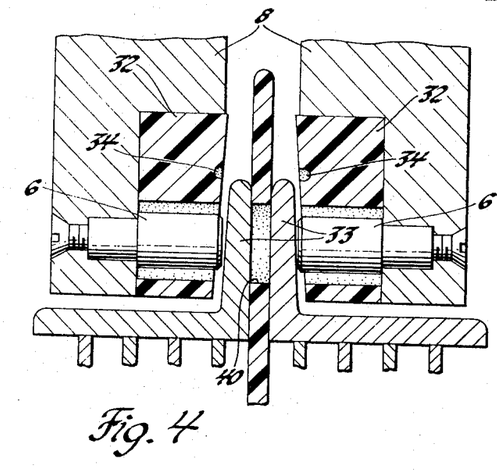
FIG. 4 is an enlarged sectional front elevational view of a portion of the tool of FIG. 2 and showing the position of the parts before actuating the tool.

In operation, the battery is positioned with the plate strap lugs 33 between the electrodes 6 as best illustrated in FIG. 4. When so positioned the hydraulic cylinder is actuated driving the output shaft 24 thereof completely downwardly until it bottoms out against stop 36. At this time, the follow-through-springs 26 (i.e., Bellevilles) compress and "bottom out" the enclosing pads completely, and the system is thus "locked up" with the initial cold extrusion taking place as best illustrated in FIG. 5. FIG. 5 shows lug extrusions 38 pushed out from the lugs 33 and meeting in the aperture 40 in the intercell partition. The flattened interface area 39 formed between the extrusions 38 comprises about 15 to 75 percent of the area of the aperture 40. The now-compressed follow-through-springs 26 are ready to provide the source for the quick follow-through force required by the system. Next the welding current is turned on and gradually increased to its maximum level. The lug extrusions 38 heat up, soften, and under the force applied by the springs 26, flow somewhat to more completely fill the aperture 40 with the soft but still solid metal as best illustrated in FIG. 6. At this point, some void volume in the form an an annulus or ring 42 remains in the aperture around the lug extrusions 38 and adjacent the wall of the aperture. Almost immediately after softening, the ever increasing current raises the temperature of the lug extrusions 38 at their interface 39 to the melting point of the antimony-rich phase of the alloy and this phase melts. Upon melting and under the instantly available applied force of the follow-through-springs 26, the Sb-rich phase exudes out of the center of the weld zone and into the annuluar void space 42 before any substantial melting of the antimony-lean-phase occurs. This results in the formation of an antimony-rich annulus (b) [FIG. 7] in the previously void space 42 and an antimony-lean center portion (a) [FIG. 7]. During the remainder of the welding cycle, the Sb-lean center portion (a) heats to its melting point and fusion bonding of the center portions finally occurs. The antimony-lean region (a) of FIG. 7 is weaker than the antimony-rich region (b), and since it is the last to melt, its size and/or degree of fusion is an indicator of what energy adjustments should be made to the system.

Figure 8:
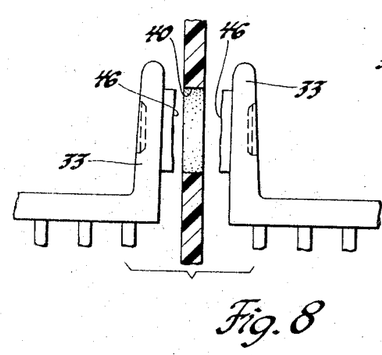
FIG. 8 illustrates the parts ruptured for observation in conjunction with the quality control aspect of the invention.
Figure 9:
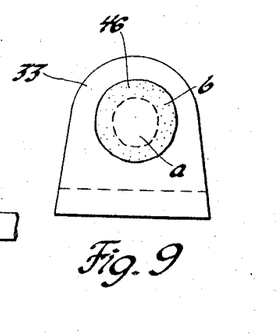
FIG. 9 illustrates an indicator core characteristic of a cold weld.
Figure 10:
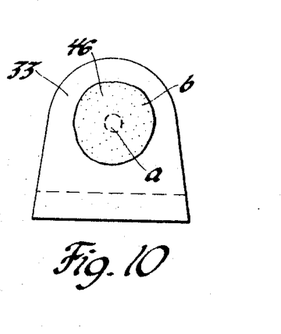
FIG. 10 illustrates an optimum indicator core size.
Figure 11:
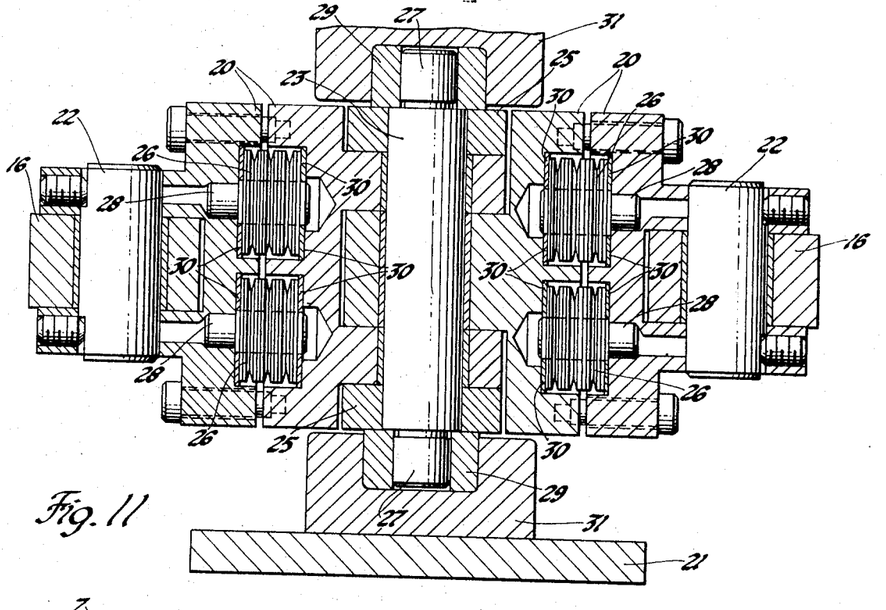
FIG. 11 is an enlarged partially sectioned, plan view in the direction 11—11 of FIG. 2 showing the drive linkage.
Figure 12:
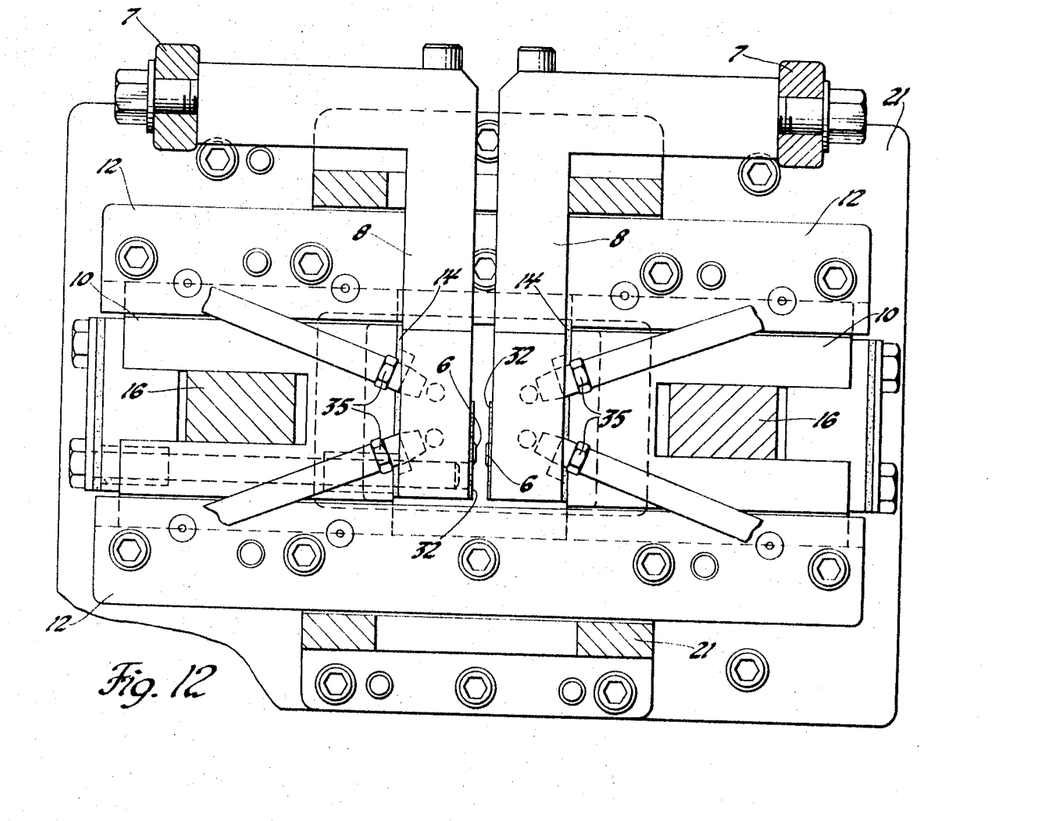
FIG. 12 is an enlarged partially sectioned plan view in the direction 12—12 of FIG. 2.

To monitor the process, an occasional battery is removed from the line and its connectors immediately twisted to rupture as illustrated in FIG. 8. Rupture 46 will always occur through the region (a) where the bond is weakest and which was the last to melt. The size (i.e., diameter) of this last-to-melt portion (a), as seen on the rupture faces 46 (FIGS. 9 and 10), indicates whether the welding conditions require adjustment to bring the process back into line. In this regard, a large indicator core (a) [FIG. 9] dictates increasing the energy to reduce the core size to that shown in FIG. 10. If there is no core showing, energy should be reduced to produce a core like that shown in FIG. 10 which serves as a "bench mark" indicator from which to make corrective judgements. A variation of the indicator-core test allows the connection to age for about 4 hours until the center/core hardens to a degree stronger than the unfused lug metal. Well fused connections will then fracture along the interface between the unfused metal and the recrystallized metal, but low power, poorly fused metal will still fail through the core. When aged fractures display cores in excess of about 0.2 inch diameter, increased power is called for.

In one specific example of the invention plate strap lugs were cast to a thickness of 0.215 inch with a 2° draft angle on the back side of the lugs and from an alloy comprising, by weight, 3% Sb, 0.2% Sn, 0.0005% S, 0.2% As and the balance principally lead. The lugs were positioned on both sides of an intercell partition comprising an ethylene-propylene copolymer, having a thickness of 0.070 inch and an aperture 0.4 inch in diameter. The welding electrode had a diameter of 0.312 inch and was surrounded by a urethane clamping pad having a 0.402 inch diameter hole through it for the electrode. The clamping pad comprised vacuum degassed polyurethane having a Shore D hardness of 42 – 47 and a clamping face angle of 4° (a 2° mismatch with the part). Follow-through Belleville springs were selected so as to provide about 1,060 lbs. force on the electrodes and 200 lbs. clamping force in the urethane pads at the start of welding and about 560 lbs. force on the electrodes and 360 lbs. force on the pads at the end of welding for a net followthrough force exerted by the Bellevilles on the electrodes of about 340 lbs. during welding. After the initial extrusion, the current was gradually fed to the parts over a total welding period of six cycles starting with about 25% initial current and finishing with about 78% maximum current for the equipment used. The welder was a 25 KVA unit set so as to have an open circuit voltage of 8.2 volts and closed circuit voltage of about 1.5 – 2.5 volts which, of course, increased throughout the upsloped weld cycle. The current varied from about 4,200 amps initial to about 14,000 amps maximum. Under these conditions, rapid electrode movement was experienced between the third and sixth welding cycles followed by a flattening of the electrode movement trace after the current stopped and during the remainder of the welding hold cycle. The weld produced had an indicator core size of about 0.15 inch and torque tested at about 65 inch-pounds.

While I have disclosed my invention primarily in terms of specific embodiments thereof, I do not intend to be limited thereto but rather only to the extent hereinafter set forth in the claims which follow.

I claim:

1. A method of making substantially liquid-tight intercell connections for lead-acid storage batteries of the type having (a) nonconductive partitions dividing the case of the battery into compartments, (b) apertures in the partitions connecting adjacent compartments, (c) cell groups in the compartments, (d) a plate connector strap on each cell group, and (e) upstanding lugs on the connector straps with the lugs facing each other on each side of the apertures, the lugs being thicker than a said partition and having face portions on their face sides adapted to fully engage the immediate surface ares of the partitions around the apertures and joint-forming portions circumscribed by said face portions and adapted by fusion to link one lug to the other through the apertures, said method comprising the steps of:

positioning the cell groups with their associated straps in the compartments so that the lugs of the straps overlay the apertures of the partitions with the face portions adjacent the immediate surface area around the apertures, said lugs being cast from a lead alloy consisting essentially of about 2 to 4.5 percent by weight antimony, at least 0.03 percent and less than about 0.3 percent by weight tin and less than 0.001 percent by weight sulfur and comprising a fine grained solid containing a major portion of antimony-lean-phase and a minor portion of antimony-rich phase;

positioning tool means on the back sides of the lugs, the tool means for each lug including a clamp portion, a bore in the clamp portion and a conductive plunger in the bore, the bores and plungers for opposing lugs being aligned with a substantial area of their associated aperture;

actuating said tool means to cause the clamp portions to engage the lugs with a sufficient clamping force to seal off the apertures with the face portions of the lugs, the joint-forming portions being spaced from each other midway through the apertures and with the partitions defining apertures which are substantially free of lug material;

while maintaining the clamping force, squeezing the plungers with sufficient plunger pressure (a) to cause the plungers to sink into the back sides of the lugs to a depth less than their thickness and short of the mouths of the apertures to extrude said lead alloy from the joint-forming portions of the lugs into the apertures to bridge the space therein and make a contact area between the lug extrusions approximately midway through the apertures, said contact area comprising about 15 to 75 percent of the area of the aperture as viewed in a direction normal to the partition, and (b) to store sufficient rapidly-expendable potential energy in appropriate means behind said plungers to cause quick and forceful flow of said lug extrusions in immediate response to a lessening of the lug extrusions' resistance to flow;

while maintaining pressure on the plungers and force on the clamp portions, passing electrical current through the plungers and lug extrusions in gradually increasing amounts to effect staged physical transformations in the lug extrusions including first softening the lug extrusions prior to fusion, then melting the antimony-rich-phase of the alloy at said contact area and finally melting the antimony-lean-phase of the alloy at the contact area, throughout which transformations the said stored potential energy rapidly expends itself as a continuous application of sufficient plunger pressure on the extrusions to cause flow of the melted antimony-rich-phase from near the center of the weld outwardly against the walls of the apertures before any sustantial melting of the antimony-lean-phase occurs thereby forming an antimony-rich annulus around an antimony-leaner weld center;

deenergizing the electrical current and allowing the fused lead alloy in the apertures to progressively solidify from the center of the weld zone radially outward toward the aperture walls while continuing to maintain the clamping force and plunger pressure to keep the apertures filled during the solidification whereby the cell groups are electrically joined by the lugs by liquid-tight, substantially void-free, through-the-partition connections having metallurgically strong antimony-rich annuli and metallurgically weaker antimony-lean centers; and monitoring the quality of the weldments so made by selecting test samples and twisting the intercell connectors of the test samples in the plane of the partition until rupture occurs whereby antimony-rich and antimony-lean rupture zones are displayed, comparing the size of the antimony-lead alloy rupture zone against predetermined standards of acceptability and, if necessary, adjusting the welding conditions to bring the process back to within the acceptable range defined by those standards.

* * * * *

UNITED STATES PATENT AND TRADEMARK OFFICE
CERTIFICATE OF CORRECTION

PATENT NO. : 3,869,316
DATED : March 4, 1975
INVENTOR(S) : Robert C. Matter

It is certified that error appears in the above-identified patent and that said Letters Patent are hereby corrected as shown below:

Col. 1, line 66 "SB" should be -- Sb --;
Col. 4, line 36 "or" should be -- are --;
Col. 5, line 6 "apprach-" should be -- approach- --;
Col. 5, line 47 "wheeas" should be -- whereas --;
Col. 5, line 61 "lilke" should be -- like --;
Col. 8, line 41 "rame" should be -- frame --;
Col. 10, line 49 insert -- (6) -- after "six";
Col. 11, line 13 "ares" should be -- areas --; and
Col. 12, line 24 "sustantial" should be -- substantial --.

Signed and Sealed this eighteenth Day of May 1976

[SEAL]

Attest:

RUTH C. MASON
Attesting Officer

C. MARSHALL DANN
Commissioner of Patents and Trademarks